(12) United States Patent
Hjerpe

(10) Patent No.: US 10,099,581 B2
(45) Date of Patent: Oct. 16, 2018

(54) SUPPORT ARRANGEMENT FOR A CHILD SEAT

(71) Applicant: VOLVO CAR CORPORATION, Gothenburg (SE)

(72) Inventor: Erik Hjerpe, Torslanda (SE)

(73) Assignee: VOLVO CAR CORPORATION (SE)

( * ) Notice: Subject to any disclaimer, the term of this patent is extended or adjusted under 35 U.S.C. 154(b) by 85 days.

(21) Appl. No.: 15/134,884

(22) Filed: Apr. 21, 2016

(65) Prior Publication Data

US 2016/0318425 A1 Nov. 3, 2016

(30) Foreign Application Priority Data

Apr. 28, 2015 (EP) .................................... 15165387

(51) Int. Cl.
*B60N 2/28* (2006.01)

(52) U.S. Cl.
CPC ......... *B60N 2/2884* (2013.01); *B60N 2/2821* (2013.01); *B60N 2/2824* (2013.01); *B60N 2/2863* (2013.01); *B60N 2/2875* (2013.01)

(58) Field of Classification Search
CPC .... A47C 1/08; A47C 1/11; B60N 2/28; B60N 2/2866; B61D 33/0092; B64D 11/0612
USPC .................. 297/250.1, 256.1, 256.11, 256.13
See application file for complete search history.

(56) References Cited

U.S. PATENT DOCUMENTS

| | | | | |
|---|---|---|---|---|
| 3,648,306 A | * | 3/1972 | Auerbach | A47C 17/80 280/751 |
| 4,480,870 A | * | 11/1984 | von Wimmersperg | B60N 2/2809 297/216.11 |
| 4,600,217 A | * | 7/1986 | Naumann | B60R 22/03 280/808 |
| 4,627,659 A | * | 12/1986 | Hall | B60N 2/2806 297/184.13 |
| 5,375,910 A | * | 12/1994 | Murphy | A61G 5/14 297/256.13 |
| 5,487,588 A | * | 1/1996 | Burleigh | B60N 2/2806 297/250.1 |
| 5,820,215 A | * | 10/1998 | Dreisbach | B60N 2/2824 297/188.2 |

(Continued)

FOREIGN PATENT DOCUMENTS

| | | |
|---|---|---|
| DE | 202013105599 U1 | 3/2014 |
| EP | 2520780 A1 | 9/2012 |

(Continued)

OTHER PUBLICATIONS

Extended European Search Report dated Oct. 26, 2015, Application No. 15165387.0-1754, Applicant Volvo Car Corporation, 6 Pages.

*Primary Examiner* — Jose V Chen
(74) *Attorney, Agent, or Firm* — Brooks Kushman P.C.

(57) ABSTRACT

The present disclosure relates to a support arrangement for a child seat. The support arrangement comprises a support column having an axial direction. The support column is adapted to transfer a collision load in the axial direction. The support column comprises, or is constituted by, at least one inflatable body. The support column is adapted to in an inflated state of the inflatable body extend in the axial direction between the child seat and a support surface. The disclosure further relates to a kit comprising the support arrangement and a child seat. The disclosure also relates to a method to control extension in an axial direction of a support arrangement.

20 Claims, 7 Drawing Sheets

(56) References Cited

U.S. PATENT DOCUMENTS

| | | | | |
|---|---|---|---|---|
| 6,817,665 B2* | 11/2004 | Pacella | ................ | B60N 2/2806 297/216.11 |
| D535,125 S * | 1/2007 | Batchelor | ................. | D6/708.19 |
| 7,328,946 B2* | 2/2008 | Hendrikus Van Montfort | ............ | B60N 2/286 297/253 |
| 7,364,213 B2* | 4/2008 | Romolo | ............... | B60N 2/2824 296/68.1 |
| 7,467,825 B2* | 12/2008 | Jane Santamaria .. | | B60N 2/2824 297/253 |
| 7,726,737 B2* | 6/2010 | Jane Santamaria .. | | B60N 2/2887 297/253 |
| 7,748,064 B2* | 7/2010 | Hamilton | ............... | A47C 16/00 248/118 |
| 7,753,445 B2* | 7/2010 | Kassai | ................ | B60N 2/2824 297/253 |
| 8,366,192 B2* | 2/2013 | Clement | .............. | B60N 2/2821 248/503.1 |
| 8,973,987 B2* | 3/2015 | Mo | ...................... | B60N 2/2884 297/216.11 |
| 9,039,083 B2* | 5/2015 | Clement | ............. | B60N 2/2821 297/256.13 |
| 9,221,368 B2* | 12/2015 | Hou | ...................... | B60N 2/2821 |
| 9,227,537 B2* | 1/2016 | Cheng | ................. | B60N 2/2821 |
| 9,321,377 B2* | 4/2016 | Jane Santamaria .. | | B60N 2/2824 |
| 2006/0055218 A1 | 3/2006 | Barker | | |
| 2008/0224516 A1* | 9/2008 | Vegt | ..................... | B60N 2/2824 297/256.16 |
| 2008/0303321 A1* | 12/2008 | Powell | ................ | B60N 2/2824 297/216.11 |
| 2008/0315647 A1* | 12/2008 | Carine | ................ | B60N 2/2824 297/250.1 |
| 2013/0307300 A1* | 11/2013 | Pos | ...................... | B60N 2/2812 297/216.12 |
| 2015/0108800 A1* | 4/2015 | Renaudin | ................ | B60N 2/16 297/256.11 |

FOREIGN PATENT DOCUMENTS

| | | |
|---|---|---|
| EP | 2546096 A1 | 1/2013 |
| GB | 2439395 A | 12/2007 |

\* cited by examiner

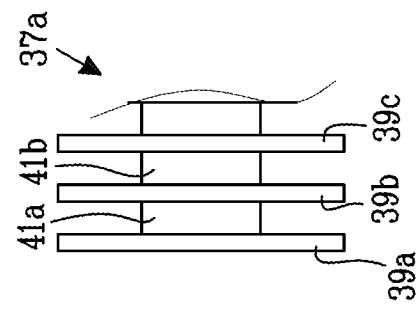
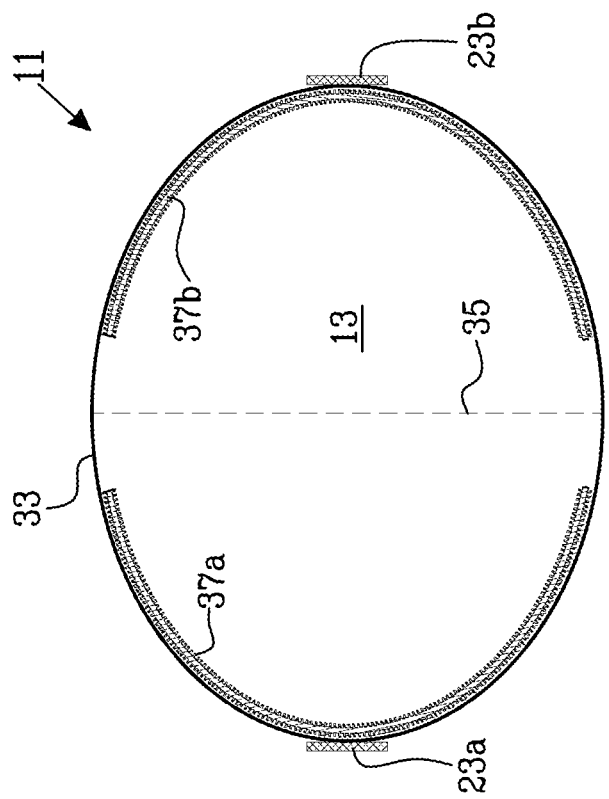
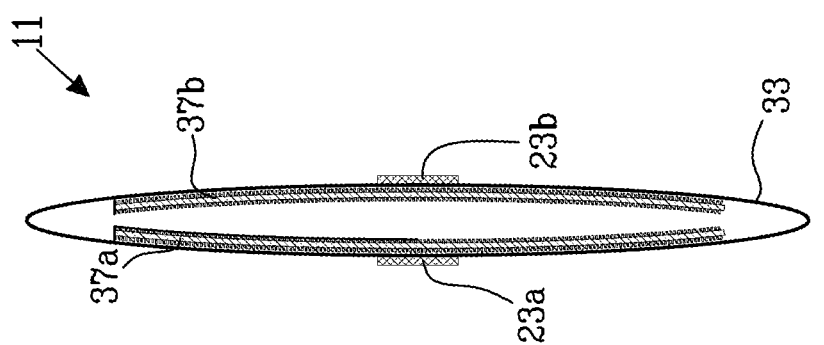

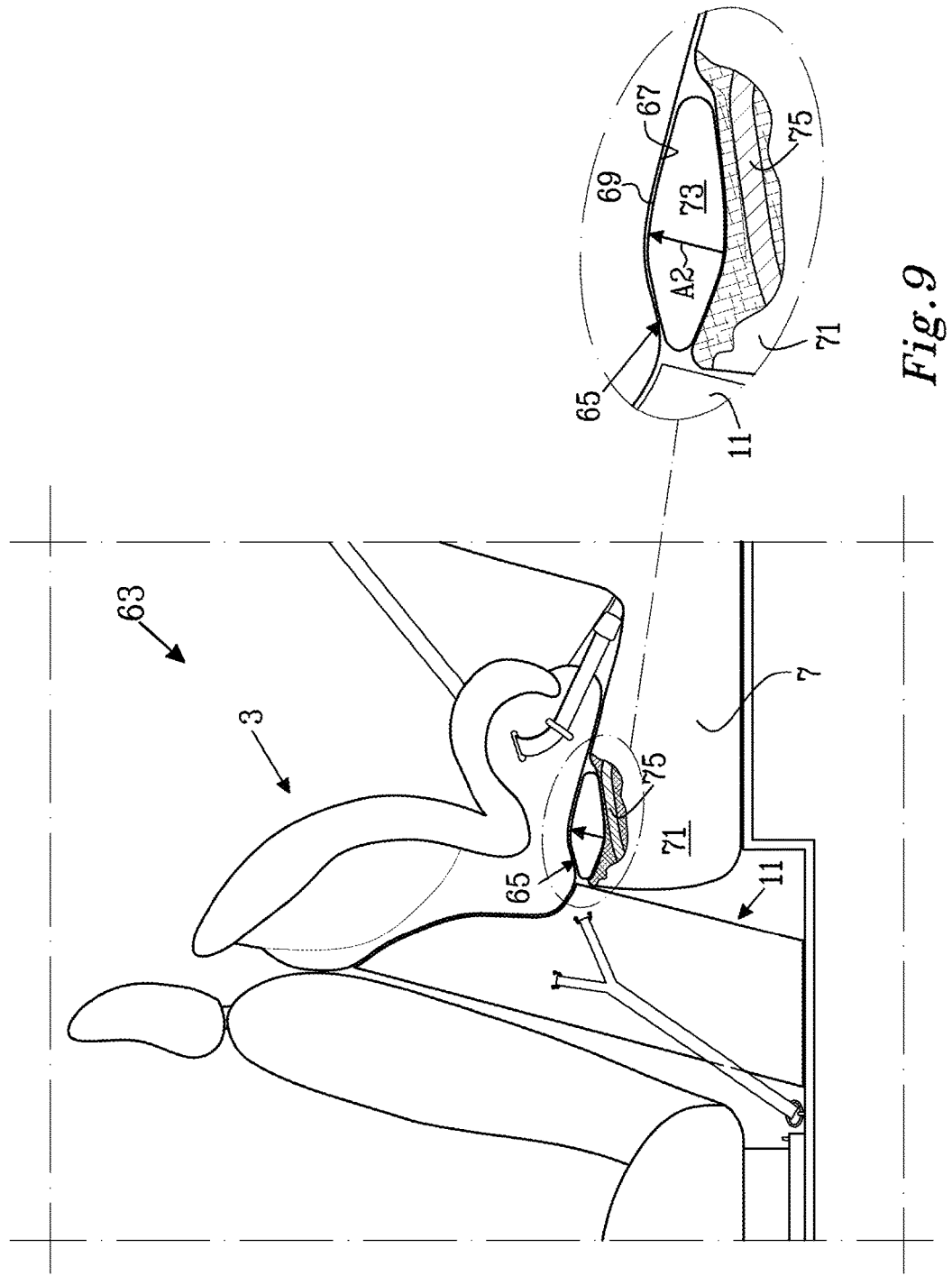

SUPPORT ARRANGEMENT FOR A CHILD SEAT

CROSS-REFERENCE TO RELATED APPLICATIONS

This application claims foreign priority benefits under 35 U.S.C. § 119(a)-(d) to European patent application number EP 15165387.0, filed Apr. 28, 2015, which is incorporated by reference in its entirety.

TECHNICAL FIELD

The present disclosure relates to a support arrangement for a child seat. The disclosure further relates to a kit comprising the child seat and the support arrangement and to a method to control extension in an axial direction of the support arrangement.

BACKGROUND

Child seats as such for use in vehicles are known. The child seat is used in the vehicle for holding a sitting child or infant.

A conventional child seat may comprise a shell of a rigid material such as plastic, which shell is intended to protect the child in case of a collision. The shell is commonly at least partly covered by a cover of a softer cushioning material to provide comfort for the child. It is also known to use a child seat, which is at least partly inflatable. See e.g., patent document EP2502780A1.

Child seats may be placed on a squab of a front seat and/or a rear seat. If placed on a squab of the rear seat, the child seat may also abut on the seat back of the seat being located in front of it, e.g., a front seat. Hence the safety properties of the child seat, e.g., in case of a collision or an imminent collision, is dependent of the properties also of this seat back.

In order to overcome this problem, it is known to use a support leg, which may abut on a floor of the vehicle. One example of a support leg is found in patent document US20060055218A1, disclosing a retractable and pivotable support leg. Another example is found in patent document EP2546096B1, wherein an embodiment discloses a rigid subframe extending between the child seat and a suitable fix point on the vehicle floor in the form of a leg, which may have a telescoping function.

The known support legs may be configured to transfer loads from the child seat to the vehicle floor, hence providing safety for the child and yet being independent of the properties of the seat back of a seat in front of it. However, such support legs may have a certain weight and/or be impractical to handle for reasons such as size and stiffness. It is known to alleviate these drawbacks by making the support leg retractable, but it may anyway be impractical to handle the support leg and the weight may still be an issue. The installation of the support leg may be rather complicated, such that there is a risk that the child seat is erroneously installed and thus not offering full protection. When not in use, the support leg will occupy a non-negligible space in the vehicle, e.g., in the luggage compartment.

There is hence a desire to provide an improved support arrangement for a child seat.

SUMMARY

An object of the present disclosure is to overcome or ameliorate at least one of the disadvantages of the prior art, or to provide a useful alternative.

Thus, in a first aspect of the present disclosure there is provided a support arrangement for a child seat. The support arrangement comprises a support column having an axial direction. The support column is adapted to transfer a collision load in the axial direction. The support column comprises, or is constituted by, at least one inflatable body. The support column is adapted to in an inflated state of the inflatable body extend in the axial direction between the child seat and a support surface.

The child seat is to be used in a vehicle for holding a sitting child or infant. In order to protect the child, the child seat comprises a child safety belt arrangement, such that the child or infant can be secured to the child seat. The support arrangement as described herein is intended to support a child seat adapted to hold the child or infant in a rearward-facing position.

The axial direction of the support column is quite close to vertical, e.g., within the range of 0-30 degrees from a vertical direction, preferably in the range of 5-15 degrees, when the support arrangement is mounted in the vehicle. The axial direction of the support column may substantially correspond to a direction of a seat back of a vehicular seat, when being adjusted to a normal sitting position.

In case of a collision occurring involving the vehicle, in which the child seat and the support arrangement for the child seat are mounted, the support column will be subjected to collision forces. The support column is adapted to transfer a collision load in the axial direction. The collision load is higher than just the combined weight of the support arrangement, the child seat and the child. The collision load may e.g., be in the range of 1 kN-10 kN. The support column will be partly compressed due to the collision load in the axial direction, which contributes to increase the gas pressure in the inflatable body, thus offering a higher resistance to compression and hence a better ability to withstand the load.

The support of the child seat may work independently of a seat back of a passenger seat in front of it, since the child seat is supported via the support column and from a seat on which it is placed, and especially since the support column is strong enough to also withstand forces arising in case of a collision. Hence, there may be an interspace between a seat back of the child seat and the seat back of the seat in front of it, although it is also feasible to place the seat back of the child seat in direct contact with the seat back of the seat in front of it.

The support arrangement may comprise one support column. The support arrangement may also comprise two or more support columns. The support arrangement may comprise a Y-shaped support column, which has two upper portions directed towards the child seat, which upper portions come together and form a common lower portion facing the support surface.

The support column may comprise a child seat contacting portion, which is adapted to support a seat back of a child seat. The support column in that case has an extension in the axial direction adapted to span a distance between the seat back of the child seat and a vehicle floor, the vehicle floor forming the support surface. The child seat is assumed to be placed on a squab of one of the seats of the vehicle. The extension of the support column may in this case be in the range of 0.25 m to 1.25 m, preferably in the range of 0.4 to 1.0 m. The child seat contacting portion is preferably shaped such that it conforms to at least a portion of the seat back of the child seat.

As an alternative to, or as a complement to, a support column having an extension in the axial direction adapted to span a distance between a seat back of the child seat and a vehicle floor, the support column may comprise a child seat contacting portion, which is adapted to support a sitting portion of a child seat, the support column having an extension in the axial direction adapted to span a distance between the sitting portion and a vehicle seat. The child seat is assumed to be placed in the vehicle seat, on which the support column abuts, the vehicle seat forming the support surface. The extension of the support column may in this case be in the range of 1 cm to 25 cm, preferably in the range of 1.5 to 15 cm. The support column may in that case have a larger cross-directional extension than its extension in the lateral direction. In case of a collision, the child seat will be forced in a downward direction, being substantially parallel to the axial direction of the support column. The support column will then compress an underlying compressible material, such as foam, located in the squab of the seat, such that the support column eventually may indirectly abut on an anti-submarining seat member, i.e., a rigid metal structure of the seat, via the compressed compressible material.

The support arrangement may comprise at least one support column of each kind described above. In that case, the support column having an extension in the axial direction adapted to span a distance between the seat back of the child seat and the vehicle floor may be made with a narrower cross-section, as compared if it is the only support column, since some of the collision load is transferred via another support column to the vehicle seat.

It is also feasible, as an alternative or a complement, to have support columns extending to other parts of the vehicle interior, e.g., to another seat, a side wall, one of the pillars, or a roof.

The inflatable body may be adapted to withstand an internal gas pressure above atmospheric pressure, e.g., an overpressure in the range of 0.1 to 1.0 bar, i.e., 10 to 100 kPa, such that the total internal gas pressure is in the range of about 1.1 to 2.0 bar, i.e., 110 to 200 kPa. The gas may be air, $CO_2$, $N_2$ or any combination thereof.

The support arrangement may further comprise at least one inflation means, being able to supply the inflatable body with gas, preferably at a pressure above atmospheric pressure. The inflation means may be a compressor, e.g., adapted to use air. The compressor may be built into the support column, into the child seat or into the vehicle, or the compressor may form a separate unit. If the compressor is built into the vehicle, the compressor may also be used for other purposes in the vehicle. As an alternative, or a complement, the inflation means may comprise a gas cartridge, e.g., for $CO_2$. It is also feasible to use compressed gas from an external source, e.g., from a filling station, which often provides compressed gas for purposes like filling tyres.

If using a compressor, as described above, the compressor may also be used to evacuate the gas from the inflatable body of the support arrangement, by pumping the gas out of the inflatable body. This may be desirable when the child seat and the support arrangement are not in use, e.g., being stored in a luggage compartment of the vehicle.

The inflatable body may comprise a plurality of gas chambers, e.g., at least two gas chambers. This may be beneficial, since it is easier to increase the gas pressure by compression due to e.g., collision load, for a smaller gas chamber and hence obtain a greater over-pressure. In addition, it may be advantageous from a safety point of view, in case there is a risk of puncture of the inflatable body. The different gas chambers may form closed cells, or they may be in fluid communication with each other.

In case the at least two gas chambers are in fluid communication with each other, there is preferably some kind of a valve between the gas chambers, such that it is possible to build up an extra pressure in one of the gas chambers during a collision scenario. There may e.g., be a throttle in the fluid connection, such that it takes some time for the gas to pass from one gas chamber to the next, this time being longer than the compression stage of the collision scenario. The valve, e.g., the throttle, may also be used to dampen any flow or reflow between the at least two gas chambers. Since the at least two gas chambers are in fluid communication, the same inflation means may be used to fill the at least two gas chambers with gas.

The inflatable body may have a one-walled or two-walled cross-section.

If having one wall, the volume enclosed by the wall may form the inflatable volume of the inflatable body. The wall then forms an outer wall of the inflatable body. When inflated, the cross-section of the inflatable body may have a circular, elliptic, square, rectangular, other polygonal shape or an arbitrary shape. The shape may be controlled by internal walls or tethering elements, e.g., as known from airbags used in vehicles for protection of vehicle users or pedestrians. Internal walls may also be used to divide the inflatable body into two or more gas chambers as mentioned above.

If having two walls, it is preferred that one wall forms an outer wall and the other an inner wall, located inside the outer wall. The walls are spaced apart from each other when the inflatable body is in the inflated state, e.g., by a distance being in the range of 1 to 20 cm, e.g., 5 to 15 cm. The inner wall may be concentrically located in the outer wall, such that the two walls of the support column form a tubular structure. The walls may in that case comprise, or be constituted by a drop-stitch fabric material. The stitches of the drop-stitch fabric material will hold the walls at a predefined distance from each other, when an inflatable volume enclosed between the walls is inflated. It is known to use drop-stitch fabric material for an inflatable child seat, see patent document EP2502780A1. The same kind of material may also be used for the support column. Advantageously, both the child seat and the support column may comprise drop-stitch fabric material. When inflated the cross-section of the tubular structure may have a circular, elliptic, square, rectangular or other polygonal ring shape.

Also the two-walled inflation body may comprise a plurality of gas chambers, e.g., at least two gas chambers. It may further be possible to also inflate the volume enclosed by the inner wall.

The support arrangement may as an option comprise at least one strap, an active length of the strap being used to control the extension of the support column, or a portion thereof, in the axial direction.

The support arrangement may comprise a pair of straps with a strap located at either side of the support column. It is also feasible to use three, four or more straps.

The strap may have a fixed active length, or the active length may be adjustable e.g., by means of a buckle. The fixed active length may be preselectable, e.g., adapted to a certain vehicle model.

The active length of the strap is used to control the extension of the support column, or a portion thereof, in the axial direction. The strap may have a longer total length, such that a part of the length is inactive. The inactive length may e.g., be located outside a buckle or an attachment to the support column.

When inflating the inflatable body, it wants to expand to its full size. However, the strap will restrict the inflatable body from reaching its maximum possible axial extension.

The active length of the strap is used to control the axial extension of the support column. If making the active length shorter, e.g., by using a shorter strap, or by shortening the active length, if the strap is adjustable, the axial extension of the support column will be less. If making the active length longer, e.g., by using a longer strap, or by lengthening the active length, if the strap is adjustable, the axial extension of the support column will be greater. The maximum possible axial extension of the support column corresponds to that when the inflatable body is fully inflated and not restricted by the strap. If this extension is desired, the strap may be dispensed with.

The strap may be attachable to, or attached to, the support column. The strap may be located on the outside of the support column or on the inside. The strap may be sewn, welded and/or glued to the support column at one or more attachment sites. The strap may as an alternative, or a complement, be attachable to, or attached to the child seat. It is also feasible that the strap as an alternative, or a complement, is attachable to, or attached to, the vehicle, e.g., to an attachment site at the floor or rails of a seat.

As mentioned above, the strap may be attachable to, or attached to, the support column. The strap may then be attachable to, or attached to, the support column at a first attachment site and at a second attachment site spaced apart from each other, the active length of the strap being accommodated between the first and the second attachment sites. The first attachment site may be located at an upper portion of the support column and the second attachment site may be located at a lower portion of the support column. A first distance between the first and the second attachment sites is determined along a surface of the support column. A second distance between the first and the second attachment sites is determined as a shortest distance in the axial direction between the first and the second attachment sites. The first distance follows the surface of the support column and is larger than or equal to the second distance. The active length of the strap determines the second distance. If the surface between the first and the second attachment sites is straight, the active length of the strap is not restricting the support column. In that case, the second distance equals the first distance and the strap may slacken. As mentioned above, the strap may have a preselectable fixed active length, e.g., adapted to a certain vehicle model, or an adjustable length.

The support may as an option comprise a reinforcing structure, the reinforcing structure being adapted to extend in the axial direction when the inflatable body is in the inflated state, preferably the reinforcing structure being located inside the support column.

The reinforcing structure may be located inside the inflatable body, e.g., along the inside of the outer wall, e.g., attached to the outer wall. As an alternative, the reinforcing structure may be incorporated into the wall, e.g., between different layers of the wall. The reinforcing structure extends in the axial direction and is configured to be able to carry load in the axial direction. The axial extension of the reinforcing structure is less than or equal to the axial extension of the support column. The axial extension of the reinforcing structure determines a minimum possible axial extension of the support column. In most cases however, the axial extension of the support column will be larger than that of the reinforcing structure. In such cases, the support column is first more easily compressed and, when it is so compressed that the axial extension corresponds to that of the reinforcing structure, the support column will be less easily compressed, as the reinforcing structure will contribute to carrying the load.

The reinforcing structure may comprise a plurality of ribs located beside each other, wherein a rib of the plurality of ribs is connected to a consecutive rib. Each rib may be connected to its preceding and following neighboring rib by connections except for the first and the last rib. It is also feasible that the reinforcing structure goes around the whole circumference of the support column. A reinforcing structure comprising ribs is easy to roll when the support column is in its uninflated state. Thereby the support arrangement may be packed in a volume-efficient way. The reinforcing structure also contributes to maintain the desired cross-sectional shape of the support column. The ribs may be made of metal, plastic and/or wood.

The support arrangement may further comprise a child seat portion forming an integral unit with the support column. The child seat portion is preferably at least partly inflatable. In that case there is preferably a fluid connection between the inflatable child seat portion and the inflatable body of the support column.

In case the child seat portion and the inflatable body are fluidly connected, there is preferably some kind of a valve between the child seat portion and the inflatable body, such that it is possible to build up an extra pressure in the inflatable body during a collision scenario. There may e.g., be a throttle in the fluid connection, such that it takes some time for the gas to pass from the inflatable body to the child seat portion, this time being longer than the compression stage of the collision scenario. The valve, e.g., the throttle, may also be used to dampen any flow or reflow between the child seat portion and the inflatable body. Since the child seat portion and the inflatable body are in fluid communication, the same inflation means may be used to fill the child seat portion and the inflatable body with gas.

In a second aspect of the present disclosure there is provided a kit comprising a child seat and the support arrangement as described herein.

The child seat is to be used in a vehicle for holding a sitting child or infant. In order to protect the child, the child seat comprises a child safety belt arrangement, such that the child or infant can be secured to the child seat. The child seat is adapted to hold the child or infant in a rearward-facing position.

The child seat may be, at least partly, inflatable. The inflatable child seat may comprise means for creating a fluid connection between the inflatable child seat and the inflatable body of the support arrangement. The inflatable body of the support arrangement may comprise corresponding means for creating a fluid connection.

The kit may further comprise an inflation means. The same inflation means may be utilized to provide gas for both the child seat and the inflatable body, in case they are adapted to be in fluid connection. As an alternative, the inflatable body and the child seat may be provided with separate inflation means. The inflation means may be of any of the kinds described above in relation to the support arrangement.

In case the child seat and the inflatable body are fluidly connected, there is preferably some kind of a valve between the child seat and the inflatable body, such that it is possible to build up an extra pressure in the inflatable body during a collision scenario. There may e.g., be a throttle in the fluid connection, such that it takes some time for the gas to pass from the inflatable body to the child seat, this time being longer than the compression stage of the collision scenario. The valve, e.g., the throttle, may also be used to dampen any flow or reflow between the child seat and the inflatable body.

The kit may comprise at least one strap of the kind described herein, wherein an active length of the strap is adapted to control the extension of the support column in the axial direction in the inflated state of the inflatable body. The strap is attachable to, or attached to, the support column and/or to the child seat. The strap may extend between an upper attachment site at the upper portion of the support column or at the child seat and a lower attachment site at the floor of the vehicle or at a lower portion of the support column. The strap may also be attachable to, or attached to, other parts of the vehicle interior, e.g., another seat, a side wall, one of the pillars, or a roof. The strap may be a separate unit, which is attachable to any of the components described above.

In a third aspect of the present disclosure there is provided a method to control extension in an axial direction of a support arrangement as described herein, or for a kit as described herein. The method comprises:
 inflating the inflatable body of the support column with a gas pressure above atmospheric pressure,
 controlling the extension of the support column, or a portion thereof, in the axial direction by means of the active length of the strap.

As mentioned above, the strap may have a preselectable fixed active length, e.g., adapted to a certain vehicle model, or an adjustable length.

In a fourth aspect of the present disclosure there is provided a vehicle comprising a support arrangement as described herein, or a kit as described herein.

The support surface, on which the support column abuts, may be a floor of the vehicle, such that the support column is adapted to extend between the child seat and the floor in the inflated state of the inflatable body.

As an alternative, or a complement, the support surface, on which the support column abuts, may be a squab of a seat of the vehicle, such that the support column is adapted to extend between the child seat and the squab in the inflated state of the inflatable body.

As mentioned above, there may for example be both a support column abutting on the floor and a support column abutting on the squab. It is also feasible to only use either a support column abutting on the floor or a support column abutting on the squab. Further, the support column abutting on the floor and the support column abutting on the squab may be integrated into one unit.

BRIEF DESCRIPTION OF THE DRAWINGS

Non-limiting embodiments according to the present disclosure will hereinafter be further explained with reference to the attached drawings.

FIGS. 2A-B illustrate a cross-section of the support column of the support arrangement of FIG. 1;

FIG. 3 illustrates a reinforcing structure of the support column of FIGS. 2A-B;

FIG. 9 illustrates a second embodiment of the support arrangement;

It should be noted that the appended drawings are not necessarily drawn to scale and that the dimensions of some features of the present disclosure may have been exaggerated for the sake of clarity.

DETAILED DESCRIPTION

As required, detailed embodiments are disclosed herein. It should however be realized that the embodiments are included in order to explain principles of the disclosure and not to limit the scope of the disclosure, defined by the appended claims. Details from two or more of the embodiments may be combined with each other. Furthermore, the figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
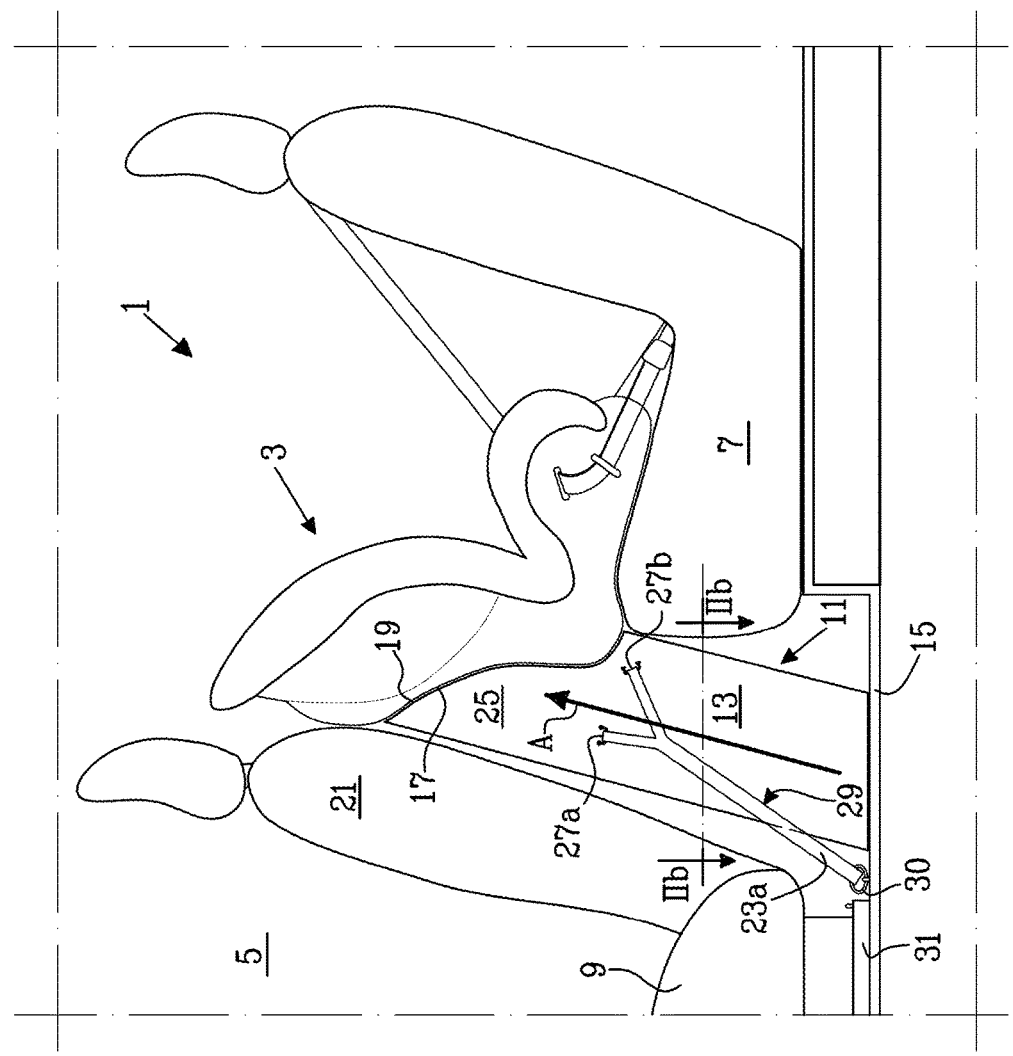
FIG. 1 illustrates a support arrangement for a child seat according to an embodiment of the disclosure.

FIG. 1 illustrates a support arrangement 1 for a rearward-facing child seat 3. The child seat 3 is to be used in a vehicle 5 for holding a sitting child or infant. The vehicle 5 comprises a number of seats. In the illustrated embodiment, the child seat 3 is placed on a squab of one of the rear seats 7, but it may, as an alternative, also be placed in a front seat 9. The child seat 3 may be inflatable, but may also be of any other kind as known in the art, such as the well-known kind comprising a plastic shell. The support arrangement 1 and the child seat 3 may together form a kit.

The support arrangement 1 comprises a support column 11 having an axial direction A. The support column 11 comprises, or is constituted by, at least one inflatable body 13. The support column 11 is adapted to in an inflated state of the inflatable body 13 extend in the axial direction A between the child seat 3 and a support surface, in the illustrated embodiment formed by a vehicle floor 15. The support column 11 comprises a child seat contacting portion 17, which is adapted to support a seat back 19 of the child seat 3. The child seat contacting portion 17 is shaped such that it conforms to the seat back 19 of the child seat 3.

The support column 11 is adapted to transfer a collision load in the axial direction A. Under normal usage conditions, the support column 11 contributes to carry the weight of the child seat 3, with or without the child in it. However, in case of a collision, much higher forces will arise. The collision load may e.g., be in the range of 1 kN-10 kN. The support column 11 is configured to withstand a force of the magnitude that may arise in a collision situation. The support column is then partly compressed in the axial direction A, contributing to increasing the gas pressure of the inflatable body 13.

As illustrated in FIG. 1, the support of the child seat 3 may work independently of a seat back 21 of the passenger seat 9 in front of it, since the child seat 3 is supported via the support column 11 and from the seat 7 it is placed on, and especially since the support column 11 is strong enough to also withstand forces arising in case of a collision. There may hence be an interspace between the seat back 19 of the child seat 3 and the seat back 21 of the front seat 9, although it is also feasible to place the seat back 19 of the child seat 3 in direct contact with the seat back 21 of the front seat 9.

The support arrangement 1 may further comprise at least one strap, e.g., a pair of straps 23a, 23b, whereof only one 23a may be seen in FIG. 1. In the illustrated embodiment of FIG. 1, the strap 23a extends between an attachment at an upper portion 25 of the support column 11 and the floor 15 of the vehicle 5. The upper part of the strap 23a is V-shaped such that the strap 23a is attached to the support column 11 at two different attachment sites 27a, 27b, both located in the upper portion 25. The strap 23a has an active length 29, i.e., the portion of the strap 23a controlling the axial extension of the support column 11 by adjusting a distance between the attachment sites 27a, 27b and the floor 15.

The strap 23a may have a fixed active length 29, as illustrated in FIG. 1, or the active length may be adjustable e.g., by means of a buckle. The fixed active length 29 may be preselectable, e.g., adapted to a certain vehicle model. The inflatable body 13 of the support column 11 is adapted to withstand an internal gas pressure above atmospheric pressure. When inflating the inflatable body 13, it wants to expand to its full maximum size. However, the straps 23a, 23b will restrict the inflatable body 13 from reaching its full axial extension. The active length 29 of the strap 23a is used to control the axial extension of the support column 11. If making the active length 29 shorter, e.g., by using a shorter strap 23a, or by shortening the active length 29, if the strap is adjustable, the axial extension of the support column 11 will be less. If making the active length 29 longer, e.g., by using a longer strap 23a, or by lengthening the active length 29, if the strap is adjustable, the axial extension of the support column 11 will be greater. The maximum possible axial extension of the support column 11 corresponds to that the inflatable body 13 is fully inflated and not restricted by the straps 23a, 23b.

The strap 23a, 23b may be attachable to an attachment site 30 in the floor 15 or it may be attachable to rails 31 of the front seat 9.

In case of a collision, the child seat 3 is pressed in a downward direction, being substantially parallel to the axial direction A. The support column 11 will then be compressed in the axial direction A. Thereby the gas pressure in the inflatable body 13 is increased, such that the support column 11 is able to take an even higher load.

If the child seat 3 is inflatable, the same inflation means may be utilized to provide gas for both the child seat 3 and the inflatable body 13. The inflatable child seat 3 should then be attached to the support column 11, such that it is in fluid connection with the inflatable body 13, e.g., via fluid connection means located in the inflatable child seat 3 and the inflatable body 13 of the support arrangement 1, respectively. As an alternative, the inflatable body 13 may be provided with its own inflation means. Preferably the gas has a pressure above atmosphere. The gas may be air, $CO_2$, $N_2$ or any combination thereof.

FIGS. 2A and 2B illustrate a cross-section of the support column 11 of the support arrangement 1 of FIG. 1 when the inflatable body 13 is in an uninflated state, see FIG. 2A, and in the inflated state, see FIG. 2B. The straps 23a, 23b are located at either side of the support column 11. An outer wall 33 surrounds the inflatable body 13. The support column 11 may, as an option, comprise one or more internal walls 35, such that the inflatable body 13 is divided into two or more gas chambers. In the illustrated embodiment, the cross-sectional shape in the inflated state is substantially elliptic.

The support column 11 comprises two optional reinforcing structures 37a, 37b, in the illustrated embodiment located inside the inflatable body 13 along the inside of the outer wall 33, e.g., attached to the outer wall 33. The reinforcing structures 37a, 37b extend in the axial direction A and are configured to be able to carry load in the axial direction A. The axial extension of the reinforcing structure 37a, 37b is less than or equal to the axial extension of the support column 11. The axial extension of the reinforcing structure 37a, 37b determines a minimum possible axial extension of the support column 11. In most cases however, the axial extension of the support column 11 will be larger than that of the reinforcing structure 37a, 37b. In that case, the support column 11 is first more easily compressed and, when it is so compressed that the axial extension corresponds to that of the reinforcing structure 37a, 37b, the support column 11 will be less easily compressed, as the reinforcing structure 37a, 37b will contribute to carrying the load.

The reinforcing structure 37a, 37b may comprise a number of ribs 39a, 39b, 39c, . . . , each being connected to its preceding and following neighboring rib by connections 41a, 41b, . . . except for the first and the last rib. It is also feasible that the reinforcing structure goes around the whole circumference of the support column 11. A reinforcing structure 37a, 37b comprising ribs 39a, 39b, 39c, . . . , is easy to roll when the support column 11 is in its uninflated state as in FIG. 2A. Thereby the support arrangement 1 may be packed in a volume-efficient way. The reinforcing structure 37a, 37b also contributes to maintaining the desired cross-sectional shape of the support column 11.

The reinforcing structure 37a, 37b is an optional feature, which may be dispensed with.

Figure 5:
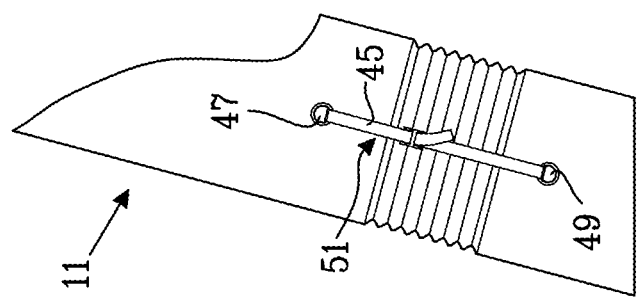
FIG. 5 illustrates another alternative way of attaching the strap used to control the axial extension of the support column.
Figure 4:
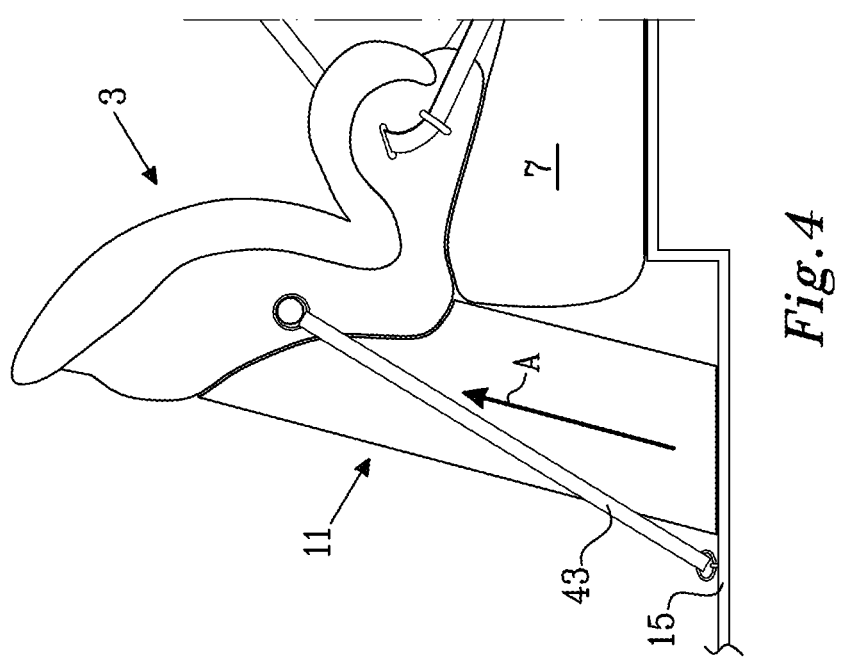
FIG. 4 illustrates an alternative way of attaching the strap used to control the axial extension of the support column.
Figure 7:
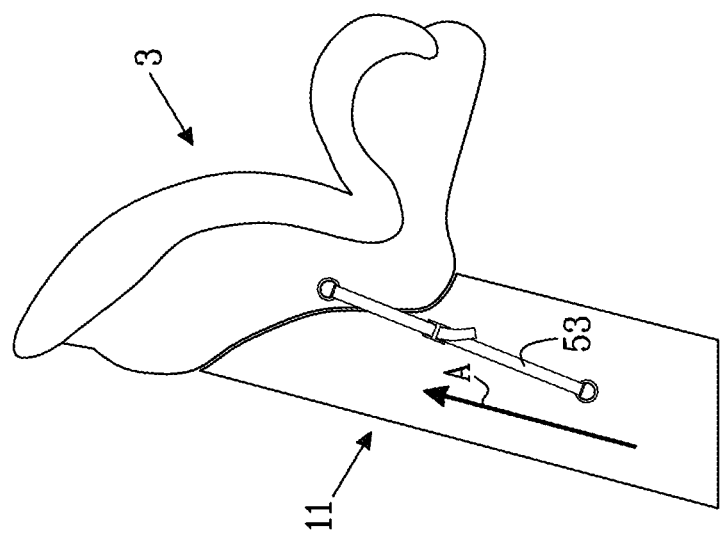
FIG. 7 illustrates yet another alternative way of attaching the strap used to control the axial extension of the support column.

FIGS. 4, 5 and 7 illustrate alternative ways of attaching the strap used to control the axial extension of the support column 11.

As illustrated in FIG. 4, a strap 43 may, as an alternative or a complement to the above-mentioned strap 23 illustrated in FIG. 1, extend between the child seat 3 and the floor 15. In a corresponding way as described above, the active length of the strap 43 may be used to control the extension of the support column 11 when being inflated.

Figure 6:
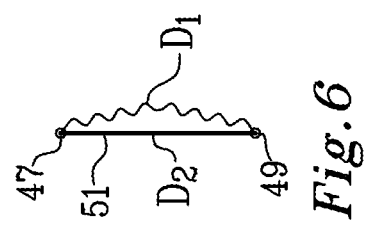
FIG. 6 illustrates how to determine a first and a second distance of the support column.

As a further alternative, or a complement, a strap 45 may extend between a first attachment site 47 and a second attachment site 49 located on the support column 11. The strap 45 may be sewn, welded and/or glued to the support column 11 in the attachment sites 47, 49. The attachment sites 47, 49 are spaced apart from each other, wherein the active length 51 of the strap 45 is accommodated between the first 47 and the second 49 attachment sites. A first distance $D_1$ between the first 47 and the second 49 attachment sites is determined along a surface of the support column 11. See FIG. 6. A second distance $D_2$ between the first 47 and the second 49 attachment sites is determined as a shortest distance in the axial direction A between the first 47 and the second 49 attachment sites. The first distance $D_1$ is larger or equal to the second distance $D_2$. The active length 51 of the strap 45 determines the second distance $D_2$ and hence the extension of the support column 11 in the axial direction A. If the surface between the first and the second attachment sites 47, 49 is straight, the active length 51 of the strap 45 is not restricting the support column 11. In that case the second distance $D_2$ equals the first distance $D_1$ and the strap 45 may even slacken.

FIG. 7 illustrates yet an alternative location of a strap 53, which may extend between the child seat 3 and the support column 11. A first distance being larger or equal to the second distance, may be determined in a corresponding way as for FIG. 6, wherein the active length of the strap 53 determines the second distance and hence the extension of the support column 11 in the axial direction A.

Figure 8B:
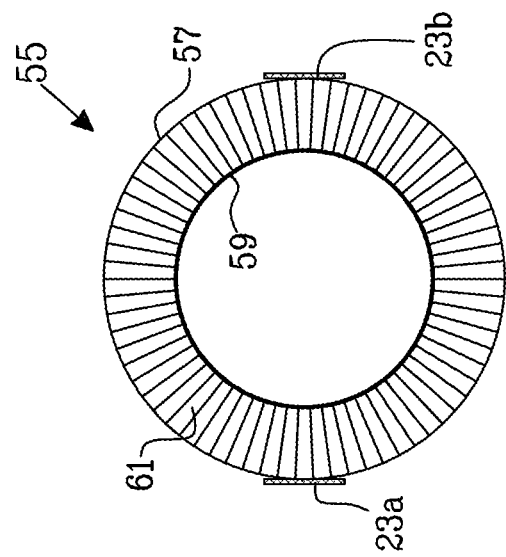
FIGS. 8A-B illustrate an alternative embodiment of the support column.
Figure 8A:
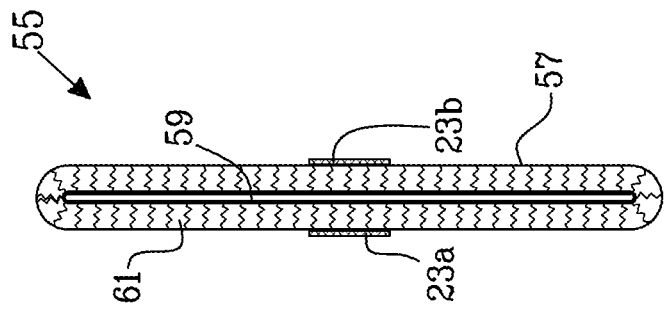

FIGS. 8A and 8B illustrate an alternative embodiment of the support column 55 in the uninflated state, see FIG. 8A, and in the inflated state, see FIG. 8B. The support column 55 of the variant comprises an outer wall 57 and an inner wall 59 forming a tubular structure. The walls 57, 59 may comprise, or be constituted by a drop-stitch fabric material. It is known to use drop-stitch fabric material for an inflatable child seat, see patent document EP2502780A1. The same kind of material may also be used for the support column 55. Advantageously, both the child seat 3 and the support column 55 may comprise drop-stitch fabric material. The stitches of the drop-stitch fabric material will hold the walls 57, 59 at a predefined distance from each other, when an inflatable volume 61 enclosed between the walls 57, 59 is inflated. The axial extension of the support column 55 may be controlled by straps, e.g., in any of the ways described above.

FIG. 9 illustrates a second embodiment of the support arrangement 63. In addition to the support column 11 described above in the illustrated embodiment of FIG. 1, the support arrangement 63 of FIG. 8 further comprises a second support column 65 supporting a sitting portion 67 of the child seat 3. Also the second support column 65 comprises a child seat contacting portion 69, which is adapted to support the sitting portion 67 of the child seat 3. The second support column 65 extends in a second axial direction $A_2$ between the sitting portion 67 of the child seat 3 and the squab of the rear seat 7. The second axial direction $A_2$ substantially coincides with the axial direction A of the support column 11 mentioned above. The second support column 65 is located at a front portion 71 of the squab of the rear seat 7. The second support column 65 comprises an inflatable body 73. The second support column 65 may have a corresponding cross-section as the support column 11 described in FIGS. 2A-B or FIGS. 8A-B. The axial extension of the second support column 65 may be controlled by a strap, e.g., extending between the child seat 3 and the second support column 65 or between the second support column 65 and a support surface of the vehicle 5, e.g., the floor 15. The axial extension of the second support column 65 may be less than its cross-sectional dimension.

In case of a collision, the child seat 3 will be pressed in a downward direction, being substantially parallel to the second axial direction $A_2$. The second support column 65 will then compress an underlying compressible material, such as foam, located in the squab of the rear seat, such that the second support column 65 eventually may indirectly abut on an anti-submarining seat member 75, a rigid metal structure of the rear seat 7, via the compressed compressible material. The support column 11 abutting on the floor 15 will be compressed in the way described above.

Figure 10:
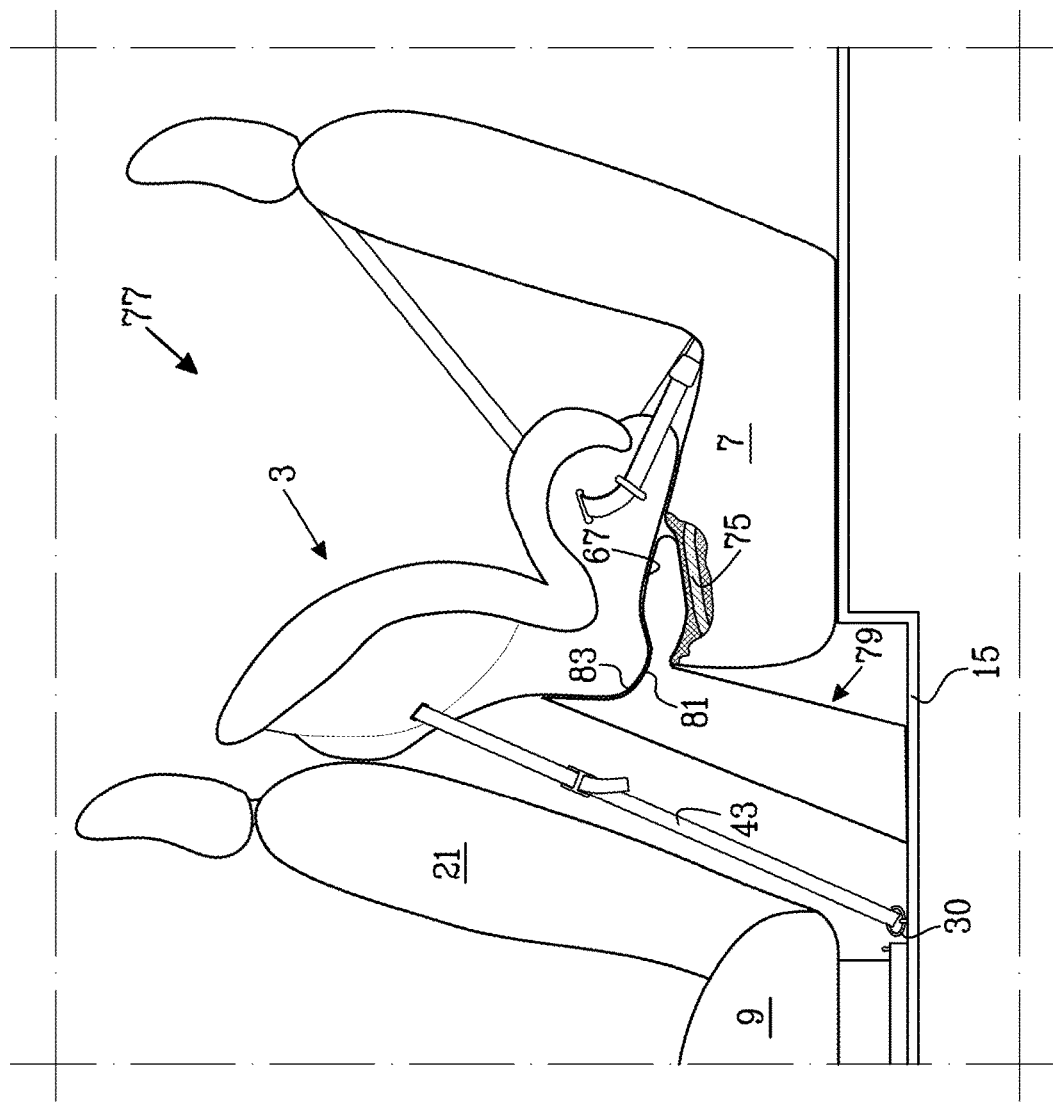
FIG. 10 illustrates a third embodiment of the support arrangement.

FIG. 10 illustrates a third embodiment of the support arrangement 77. It comprises a similar second support column 65 as for the embodiment of FIG. 9. However, instead of the support column 11 described above in the illustrated embodiment of FIG. 1, there is a smaller inflatable support column 79, e.g., with a smaller cross-section than the support column 11 described above, extending between the child seat 3 and the floor 15 of the vehicle 5. The child seat contacting portion 81 of the smaller inflatable support column 79 supports the sitting portion 67 of the child seat 3 and a lower portion 83 of the seat back 19 of the child seat 3. The strap 43 is located as described for FIG. 4, i.e., connecting the child seat 3 and the floor 15. The smaller inflatable support column 79 may form an integral unit with the second support column 65, as is illustrated in FIG. 10.

It is feasible to only utilize the second support column 65 illustrated in FIG. 9, i.e., only supporting the child seat 3 by the seat 7 it is placed on. There is in that case neither a support from the floor 15, nor a support from the seat 9 in front of the child seat 3.

Figure 11:
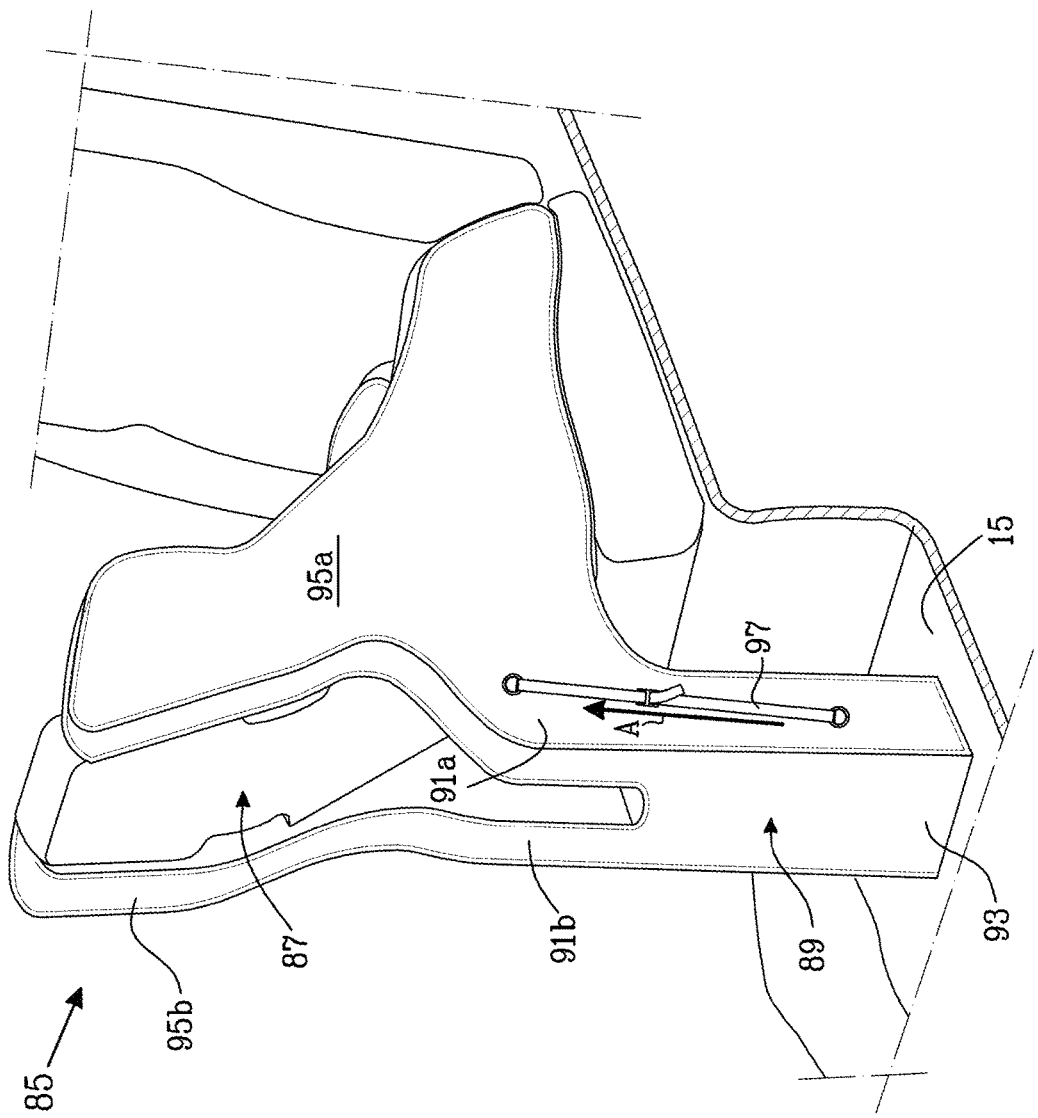
FIG. 11 illustrates a fourth embodiment of the support arrangement.

FIG. 11 illustrates a fourth embodiment of the support arrangement 85. In this embodiment, an inflatable child seat portion 87 forms an integral unit with the support column 89. There is a fluid connection between the inflatable child seat portion 87 and the inflatable body of the support column 89. The support column 89 is Y-shaped, having two upper portions 91a, 91b directed towards the child seat portion 87. The upper portions 91a, 91b come together and form a common lower portion 93 facing the support surface, here the floor 15 of the vehicle. The side walls 95a, 95b of the child seat portion 87 transforms into the two upper portions 91a, 91b of the support column 89. The axial extension of the support column 89 is controlled by straps 97, e.g., in any of the ways described above.

Further modifications of the disclosure within the scope of the appended claims are feasible. As such, the present disclosure should not be considered as limited by the embodiments and figures described herein. Rather, the full scope of the disclosure should be determined by the appended claims, with reference to the description and drawings.

While exemplary embodiments are described above, it is not intended that these embodiments describe all possible forms according to the disclosure. The words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A support arrangement for a rearward-facing child seat, the support arrangement comprising:
   a support column configured to transfer a collision load in an axial direction, the support column including at least one inflatable body, wherein the support column is configured to, in an inflated state of the at least one inflatable body, extend in the axial direction between the child seat and a support surface when the support arrangement is used with the child seat; and
   a strap that is attachable to the support column and/or the child seat and having an active length that is used to control extension of the support column, or a portion thereof, in the axial direction.

2. The support arrangement according to claim 1 wherein the support column comprises a child seat contacting portion, which is configured to support a seat back of the child seat, the support column having an extension in the axial direction adapted to span a distance between the seat back of the child seat and a vehicle floor when the at least one inflatable body is in the inflated state.

3. The support arrangement according to claim 1 wherein the support column comprises a child seat contacting portion, which is configured to support a sitting portion of the child seat, the support column having an extension in the axial direction adapted to span a distance between the sitting portion of the child seat and a vehicle seat when the at least one inflatable body is in the inflated state.

4. The support arrangement according to claim 1 wherein the at least one inflatable body is configured to withstand an internal gas pressure above atmospheric pressure.

5. The support arrangement according to claim 1 wherein the at least one inflatable body comprises a plurality of gas chambers.

6. The support arrangement according to claim 1 wherein the at least one inflatable body has a one-walled or two-walled cross-section.

7. The support arrangement according to claim 6 wherein the cross-section has a circular, elliptic, annular, square, rectangular or other polygonal shape.

8. The support arrangement according to claim 1 wherein the strap is attachable to, or attached to, the support column.

9. The support arrangement according to claim 8 wherein the strap is attachable to, or attached to, the support column at a first attachment site and at a second attachment site spaced apart from each other, the active length of the strap being accommodated between the first and second attachment sites,
- a first distance between the first and second attachment sites being determined along a surface of the support column,
- a second distance between the first and second attachment sites being determined as a shortest distance in the axial direction between the first and second attachment sites,
- the first distance being larger than or equal to the second distance,
- the active length of the strap determining the second distance.

10. The support arrangement according to claim 1 further comprising a reinforcing structure attached to the support column and configured to extend in the axial direction when the inflatable body is in the inflated state.

11. The support arrangement according to claim 10 wherein the reinforcing structure is located inside the support column.

12. The support arrangement according to claim 1 further comprising a child seat portion forming an integral unit with the support column.

13. The support arrangement according to claim 12 wherein the child seat portion is at least partly inflatable.

14. A kit comprising a rearward-facing child seat and the support arrangement according to claim 1.

15. The kit according to claim 14 wherein the child seat is at least partly inflatable.

16. The kit according to claim 15 wherein the at least one inflatable body of the support arrangement is in fluid connection with the inflatable child seat.

17. A method to control extension in an axial direction of a support arrangement for a rearward-facing child seat, the method comprising:
- inflating an inflatable body of a support column of the support arrangement with a gas pressure above atmospheric pressure;
- controlling extension of the support column, or a portion thereof, in the axial direction by an active length of a strap that is attached to the support column and/or the child seat.

18. The method according to claim 17 wherein the inflating is performed using an inflation means, and wherein shape of the support column is configured to enable the support column to extend in the axial direction when inflated.

19. The support arrangement according to claim 1 wherein the support column comprises an outer wall that surrounds the at least one inflatable body, and wherein the outer wall is shaped to enable the support column to extend in the axial direction when the at least one inflatable body is in the inflated state.

20. A support arrangement for a rearward-facing child seat, the support arrangement comprising:
- a support column configured to transfer a collision load in an axial direction, the support column including at least one inflatable body, wherein the support column is configured to, in an inflated state of the at least one inflatable body, extend in the axial direction between the child seat and a support surface when the support arrangement is used with the child seat; and
- a reinforcing structure attached to the support column and configured to extend in the axial direction when the inflatable body is in the inflated state.

* * * * *